(12) United States Patent
Usui (10) Patent No.: US 7,437,832 B2
(45) Date of Patent: Oct. 21, 2008

(54) REDUCED PRESSURE DRYING APPARATUS

(75) Inventor: Takahiro Usui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/258,885

(22) Filed: Oct. 27, 2005

(65) Prior Publication Data

US 2006/0112587 A1      Jun. 1, 2006

(30) Foreign Application Priority Data

Nov. 29, 2004    (JP)    ............................. 2004-343431

(51) Int. Cl.
*F26B 21/06*    (2006.01)
(52) U.S. Cl. ..................... 34/78; 34/92; 134/66; 118/61
(58) Field of Classification Search .................. 34/407, 34/78, 79, 80, 90, 91, 92; 134/66; 118/58, 118/61, 69
See application file for complete search history.

(56) References Cited

U.S. PATENT DOCUMENTS

| | | | | |
|---|---|---|---|---|
| 4,771,730 A | * | 9/1988 | Tezuka ..................... | 118/723 E |
| 4,854,263 A | * | 8/1989 | Chang et al. ............... | 118/715 |
| 5,520,744 A | * | 5/1996 | Fujikawa et al. ............ | 134/11 |
| 5,556,500 A | * | 9/1996 | Hasegawa et al. ......... | 156/345.27 |
| 5,608,974 A | * | 3/1997 | Tanaka et al. .............. | 34/78 |
| 5,784,799 A | * | 7/1998 | Kato et al. ................. | 34/92 |
| 6,016,611 A | * | 1/2000 | White et al. ............... | 34/92 |
| 6,108,928 A | * | 8/2000 | Park et al. ................. | 34/77 |
| 6,158,141 A | * | 12/2000 | Asada et al. ............... | 34/74 |
| 6,263,587 B1 | * | 7/2001 | Raaijmakers et al. ...... | 34/404 |
| 6,848,961 B2 | * | 2/2005 | Nomura et al. ............. | 445/24 |
| 6,866,744 B2 | * | 3/2005 | Miya et al. ............. | 156/345.24 |

FOREIGN PATENT DOCUMENTS

| | | |
|---|---|---|
| JP | 2001-170546 A | 6/2001 |
| JP | 2001-267236 A | 9/2001 |
| JP | 2003-75795 A | 3/2003 |
| JP | 2003-234273 A | 8/2003 |
| JP | 2003-262464 A | 9/2003 |
| KR | 2001-0092699 A | 10/2001 |

* cited by examiner

*Primary Examiner*—S. Gravini
(74) *Attorney, Agent, or Firm*—Global IP Counselors, LLP (57) ABSTRACT

A reduced pressure drying apparatus includes a chamber that closes in an airtight manner during a reduced pressure drying operation, a stage on which a substrate is mounted; and an exhaust unit having an exhaust tube that opens at exhaust openings within the chamber. The stage is disposed within the chamber during the reduced pressure drying operation. The exhaust unit discharges atmosphere from the chamber via the exhaust openings during the reduced pressure drying operation to reduce the pressure within the chamber. The exhaust openings are formed such that a position of the exhaust openings is substantially the same as or no higher than a surface position of the substrate. The reduced pressure drying apparatus allows a film having a more uniform thickness to be formed on the substrate.

7 Claims, 6 Drawing Sheets

REDUCED PRESSURE DRYING APPARATUS

BACKGROUND OF THE INVENTION

1. Field of the Invention

The present invention relates to a reduced pressure drying apparatus. More specifically, the present invention relates to a reduced pressure drying apparatus for drying with a reduced pressure a substrate whose surface is coated with a film material.

2. Background Information

In conventional practice, films such as orientation films of liquid crystal display devices are manufactured by uniformly coating a substrate with a material for forming an orientation film (orientation film material), and drying the applied orientation film material. In a drying apparatus, for example, a substrate is held on a stage, an orientation film material is applied, and a drying cover is placed on the stage while the substrate is held in place to form an airtight space. The substrate is dried by reducing the pressure in the airtight space.

The substrate is normally coated with the solution in a uniform manner, but when an exhaust port is provided to the bottom surface of the chamber (airtight space) and air is discharged by a vacuum pump to reduce the pressure in the chamber of the drying apparatus, air bubbles sometimes form in the substrate at a portion near the exhaust port, and the applied solution expands in a localized manner. In such cases, the thickness of the resulting film becomes non-uniform, and an orientation film with a non-uniform thickness, for example, may result, which causes display defects in a liquid crystal display device. These problems of the air bubbles and localized swelling of the solution described above become even more pronounced with bigger substrates.

In view of the above, it will be apparent to those skilled in the art from this disclosure that there exists a need for an improved drying apparatus that overcomes the problem of the conventional art. This invention addresses this need in the art as well as other needs, which will become apparent to those skilled in the art from this disclosure.

SUMMARY OF THE INVENTION

An object of the present invention is to provide a reduced pressure drying apparatus that can form a film having a more uniform thickness to be formed on a substrate.

The reduced pressure drying apparatus according to an aspect of the present invention has a chamber configured to be closed in an airtight manner during a reduced pressure drying operation; a stage on which a substrate is adapted to be mounted, the stage being configured to be disposed within the chamber during the reduced pressure drying operation; and an exhaust unit having an exhaust tube that opens at exhaust openings within the chamber, the exhaust unit being configured to discharge atmosphere from the chamber via the exhaust openings during the reduced pressure drying operation to reduce the pressure within the chamber. The exhaust openings are formed such that a position of the exhaust openings is adapted to be substantially the same or no higher than a surface position of the substrate.

BRIEF DESCRIPTION OF THE DRAWINGS

Referring now to the attached drawings which form a part of this original disclosure.

DETAILED DESCRIPTION OF THE PREFERRED EMBODIMENTS

The reduced pressure drying apparatus according to an aspect of the present invention has a chamber configured to be closed in an airtight manner during a reduced pressure drying operation; a stage on which a substrate is adapted to be mounted, the stage being configured to be disposed within the chamber during the reduced pressure drying operation; and an exhaust unit having an exhaust tube that opens at exhaust openings within the chamber, the exhaust unit being configured to discharge atmosphere from the chamber via the exhaust openings during the reduced pressure drying operation to reduce the pressure within the chamber. The exhaust openings are formed such that a position of the exhaust openings is adapted to be substantially the same as or no higher than a surface position of the substrate.

In this reduced pressure drying apparatus, the exhaust openings are formed near the surface position of the substrate mounted on the stage, such that the air is discharged via these exhaust openings during the reduced pressure drying operation. More specifically, the exhaust openings are formed at positions that are substantially at the same height as the surface position of the substrate or at positions that no higher than the surface position of the substrate. Therefore, air is discharged via openings formed near the surface of the substrate, at positions that are substantially at the same height as or lower than the surface position of the substrate. Thus, the occurrence of localized formation of air bubbles can be reduced, unlike when the exhaust ports are formed in, for example, the bottom surface of the chamber. Therefore, the film material applied to the substrate can be dried uniformly, and a film having a more uniform thickness can be formed with high precision.

The reduced pressure drying apparatus according to another aspect of the present invention further includes exhaust ports that are disposed within the chamber. The exhaust openings are formed at the exhaust ports such that each of the exhaust ports has one of the exhaust openings.

In the reduced pressure drying apparatus according to still another aspect of the present invention, the exhaust ports are disposed around the stage such that the exhaust openings face side faces of the stage.

Thus, when the stage is in the shape of, for example, a square having four sides, air is discharged via the exhaust openings that are formed in the exhausts ports so as to face the sides of the surface of the substrate. In this way, air is discharged via openings formed near the surface of the substrate, at positions that are substantially at the same height as or lower than the surface position of the substrate. Thus, the film material applied to the substrate can be dried uniformly, and a film having a more uniform thickness can be formed with high precision.

Alternatively, in the reduced pressure drying apparatus according to still another aspect of the present invention, the exhaust openings are formed on side faces of the stage.

Also, in the reduced pressure drying apparatus according to still another aspect of the present invention, at least one of the exhaust openings has a shape of a slit that extends horizontally. In this reduced pressure drying apparatus, the atmosphere of the substrate surface can be discharged uniformly, and a film with a more uniform thickness can be formed in a reliable manner.

In the reduced pressure drying apparatus according to still another aspect of the present invention, the exhaust openings are formed at a position that is lower than the surface position of the substrate. Particularly, the exhaust openings can be formed at a position that is lower than the surface position of the substrate by 1-5 mm.

These and other objects, features, aspects and advantages of the present invention will become apparent to those skilled in the art from the following detailed description, which, taken in conjunction with the annexed drawings, discloses a preferred embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
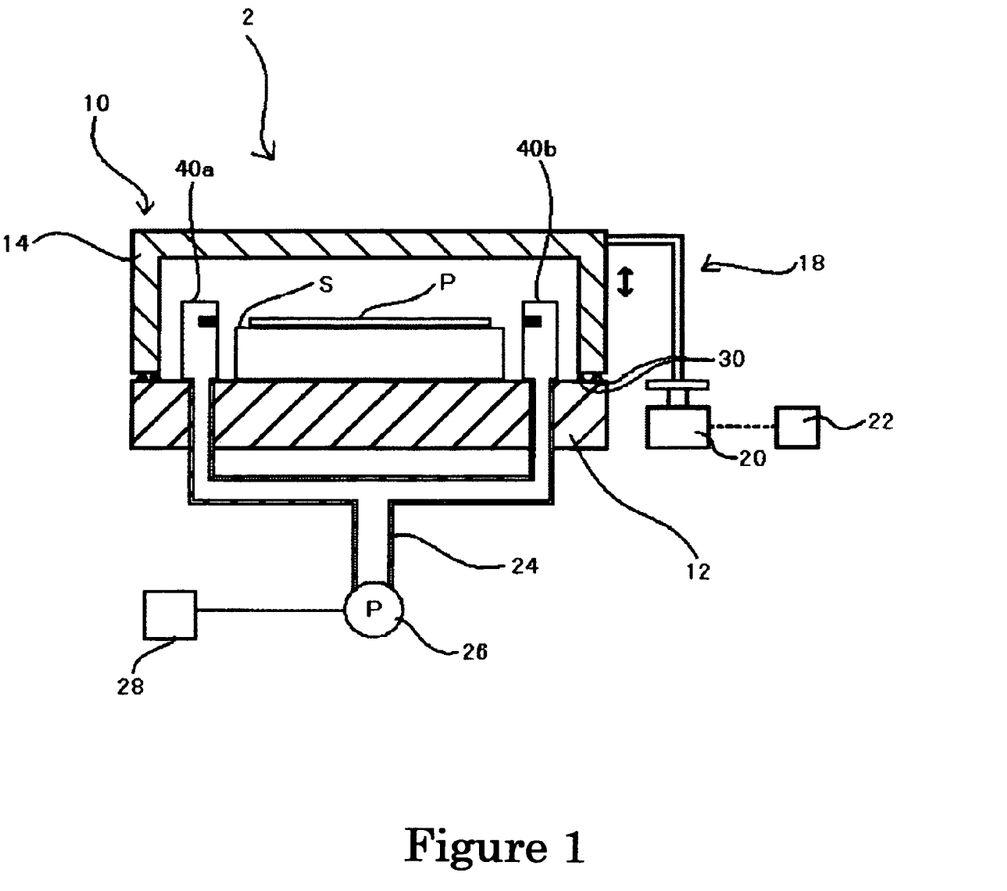
FIG. 1 is a schematic view of the reduced pressure drying apparatus according to an embodiment of the present invention.

The reduced pressure drying apparatus according to an embodiment of the present invention will now be described with reference to the diagrams. FIG. 1 is a schematic diagram of a reduced pressure drying apparatus according to the embodiment. The reduced pressure drying apparatus 2 has a chamber 10 that stores a substrate P and constitutes a treatment chamber, which is capable of being closed off in an airtight manner. The chamber 10 includes a rectangular mounting base 12 on which a stage S for holding the substrate P is mounted, and a lid 14 that has a rectangular opening in the bottom surface and is positioned above the mounting base 12. The stage S includes a mechanism for holding the substrate P with a suction holding device or another such conventional device. Also, as shown in FIG. 2 and hereinafter described, the mounting base 12 is provided with a plurality of exhaust ports (only the exhaust ports 40a and 40b are shown in FIG. 1) The plurality of exhaust ports have openings on the periphery of the stage S in the shape of slits that extend horizontally along the edge of the substrate P.

The lid 14 is provided with a hoist mechanism 18 for raising and lowering the lid 14. The hoist mechanism 18 has, for example, a drive unit 20 for raising and lowering the lid 14 with a motor, and a control unit 22 for controlling the drive unit 20. The lid 14 is thereby capable of moving up and down, and the lid 14 is lowered to form a treatment chamber together with the mounting base 12.

The mounting base 12 of the chamber 10 is provided with an exhaust tube 24 which is part of an exhaust unit for discharging the atmosphere from the treatment chamber. The exhaust tube 24 opens at openings 42a that are within the chamber 10. The exhaust tube 24 is communicated with a suction pump 26 for suctioning the atmosphere from the treatment chamber with a specific amount of pressure, and the suction force of the suction pump 26 is controlled by a pump control unit 28. As a result of this configuration, the suction pump 26 can be operated to suction out the atmosphere in the chamber 10 from the exhaust tube 24, and the pressure in the chamber 10 can be reduced. Also, the lower end surface of the lid 14 is provided with an O ring 30 for ensuring that the treatment chamber is airtight.

Figure 2:
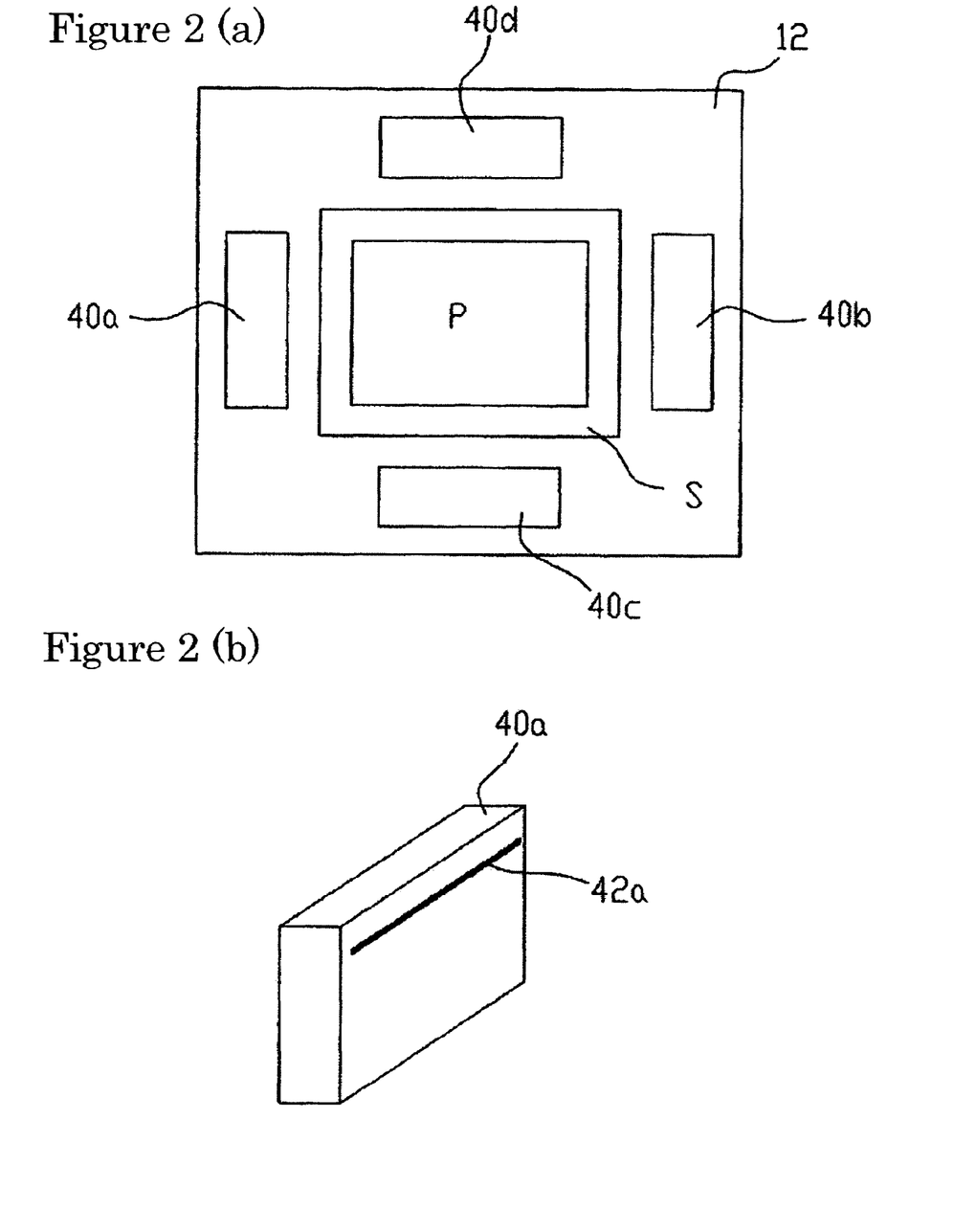
FIG. 2(a) is a schematic diagram describing the positions of the exhaust ports in the reduced pressure drying apparatus according to the embodiment of the present invention.
FIG. 2(b) is a perspective view of the exhaust port in the reduced pressure drying apparatus according to the embodiment of the present invention.

FIG. 2 is a diagram describing the exhaust ports according to this embodiment. In the reduced pressure drying apparatus 2 according to this embodiment, as shown in FIG. 2(a), exhaust ports 40a-40d are provided to the periphery of the stage S that is mounted on the mounting base 12, at positions facing each of the side faces of the square-shaped stage S. Specifically, as shown in FIG. 2(a), the exhaust port 40a is provided at a position facing the left side face of the stage S, and the exhaust port 40b is provided at a position facing the right side face of the stage S. Also, the exhaust port 40c is provided at a position facing the front side face of the stage S, and the exhaust port 40d is provided at a position facing the rear side face of the stage S.

A slit-shaped opening 42a is formed in the exhaust port 40a as shown in FIG. 2(b). The opening 42a is formed in the vicinity of the surface position SP of the substrate P that is mounted on the stage S. Particularly, the opening 42a is formed at about the same position of the substrate P or lower than the surface position SP of the substrate P. In this embodiment, for example, the opening 42a is formed at a position lower by about 1 to 5 mm than the surface position SP of the substrate P. The opening 42a has a slit shape that extends horizontally along the edge of the substrate P. Openings having the same shape as the opening 42a are formed at similar positions in the exhaust ports 40b, 40c and 40d. The exhaust tube 24 is connected to each of the exhaust ports 40a-40d, and the atmosphere inside the chamber 10 is discharged by suctioning with the suction pump 26 via the exhaust tube 24 and the openings 42a formed in the exhaust ports 40a-40d.

Next, a drying treatment in the reduced pressure drying apparatus 2 will be described. Described below is an example in which the reduced pressure drying apparatus 2 is incorporated into a line 100 for manufacturing liquid crystal display devices.

Figure 3:
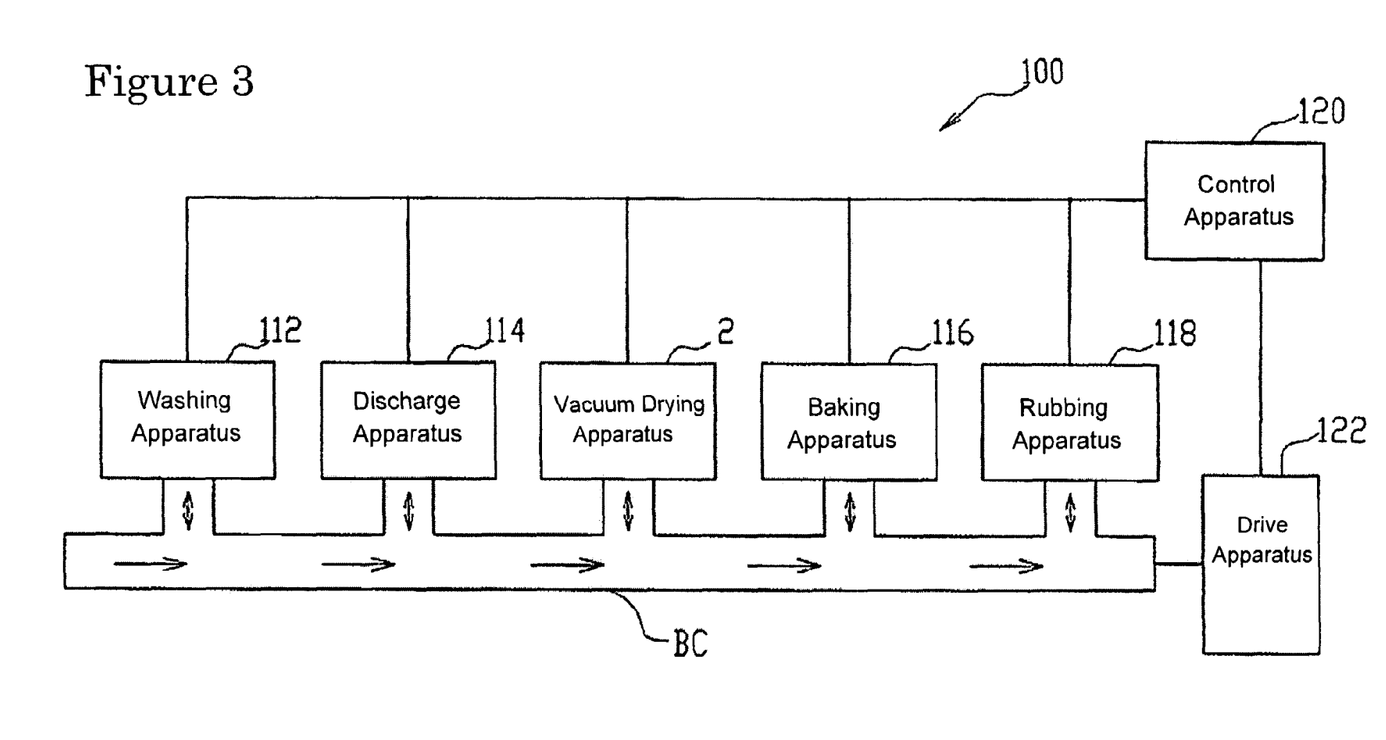
FIG. 3 is a schematic diagram showing a liquid crystal display device manufacturing line having the reduced pressure drying apparatus according to the embodiment of the present invention.

FIG. 3 is a diagram showing an example of the configuration of a line for manufacturing liquid crystal display devices that includes the reduced pressure drying apparatus 2 according to the embodiment of the present invention. As shown in FIG. 3, the line 100 for manufacturing liquid crystal display devices includes a washing apparatus 112, a discharge apparatus (droplet discharge apparatus) 114, the reduced pressure drying apparatus 2, a baking apparatus 116, a rubbing apparatus 118, a belt conveyor BC connecting the apparatuses, a drive apparatus 122 for driving the belt conveyor BC, and a control apparatus 120 for controlling the entire liquid crystal display device manufacturing line 100. Each of the apparatuses of the line 100 corresponds to each step of the liquid crystal display manufacturing process described below. The washing apparatus 112, the discharge apparatus 114, the reduced pressure drying apparatus 2, the baking apparatus 116, and the rubbing apparatus 118 are disposed in a row along the belt conveyor BC at predetermined intervals therebetween.

The control apparatus 120 is operatively connected to the washing apparatus 112, the discharge apparatus 114, the reduced pressure drying apparatus 2, the baking apparatus 116, the rubbing apparatus 118, and the drive apparatus 122, and includes a microcomputer and a control program to selectively control any of the apparatuses connected thereto. The drive apparatus 122 drives the belt conveyor BC in response to a control signal from the control apparatus 120 to convey a substrate for a liquid crystal display device (hereinafter referred to simply as "the substrate") to any of the washing apparatus 112, the discharge apparatus 114, the reduced pressure drying apparatus 2, the baking apparatus 116, and the rubbing apparatus 118.

The washing apparatus 112 is configured to wash the substrate. The discharge apparatus 114 is configured to coat the substrate with an orientation film material. In this embodiment, the apparatus 114 coats the substrate by discharging droplets containing an orientation film material onto the substrate. The reduced pressure drying apparatus 2 dries the orientation film material on the substrate. The baking apparatus 116 is configured to bake the dried orientation film material. The rubbing apparatus 118 is configured to rub the baked orientation film.

Figure 4:
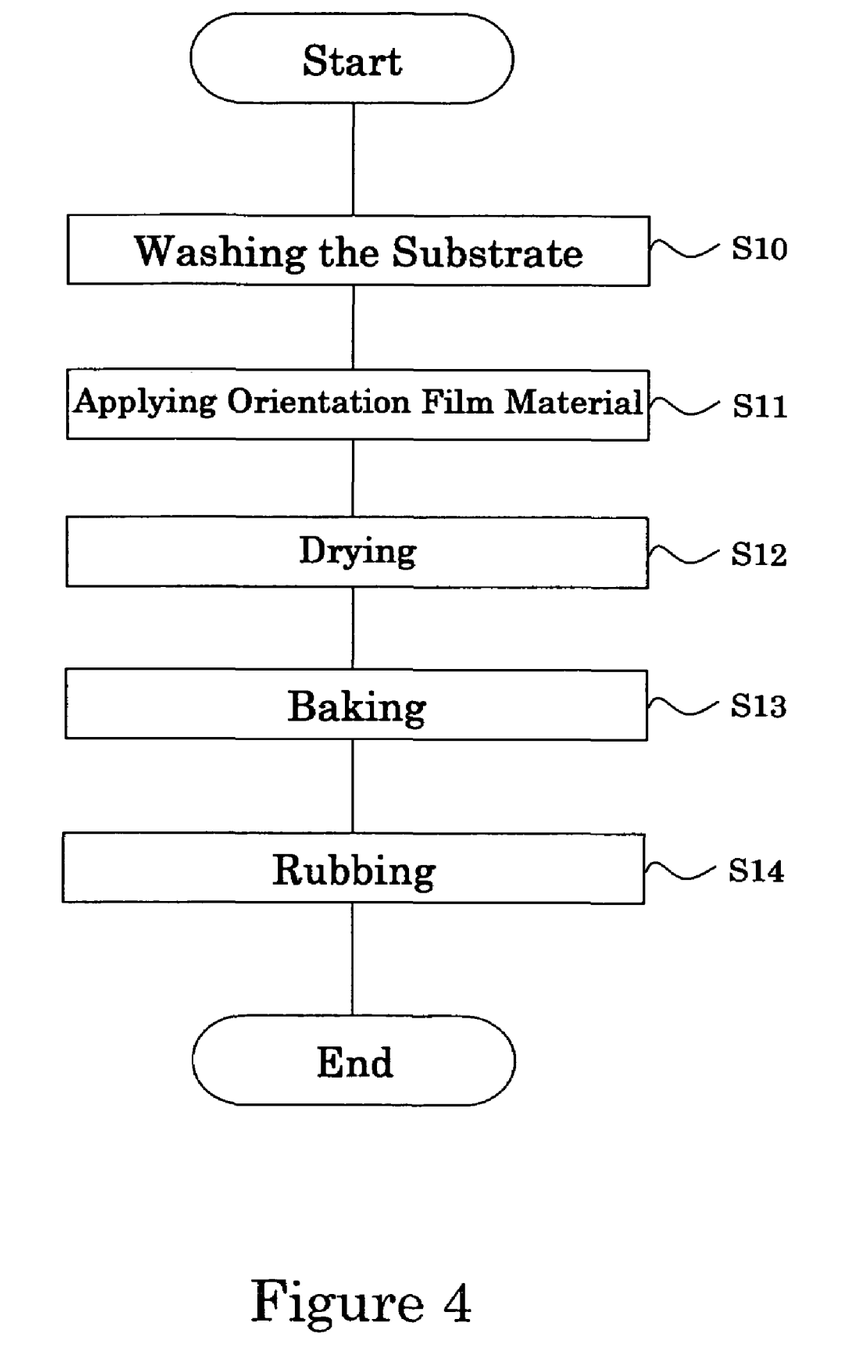
FIG. 4 is a flowchart describing the process of manufacturing a liquid crystal display device with the liquid crystal display device manufacturing line having the reduced pressure drying apparatus according to the embodiment of the present invention.

Next, the process of manufacturing a liquid crystal display device in the line for manufacturing liquid crystal display devices that uses the reduced pressure drying apparatus according to the embodiment will be described with reference to the flowchart of FIG. 4.

First, the substrate (substrate P) for forming the orientation film is washed (step S10). A substrate P on which a segmented electrode is formed, for example, is conveyed to the washing apparatus 112 by the belt conveyor BC. The substrate P is taken into the washing apparatus 112 by the belt conveyor BC. At the washing apparatus 112, the substrate P is washed with an alkali-based cleanser or pure water. Then, a treatment is conducted for drying the substrate at a predetermined temperature for a predetermined period of time; for example, at 80 to 90° C. for 5 to 10 minutes. The substrate P that has been washed and dried is then conveyed to the discharge apparatus 114 by the belt conveyor BC.

Next, the substrate P that has been washed in step S10 is coated with an orientation film material (step S11) by the discharge apparatus 114, which is a droplet discharge apparatus in this embodiment. Specifically, first, the substrate P conveyed to the discharge apparatus 114 by the belt conveyor BC is brought into the discharge apparatus 114. In the discharge apparatus 114, the orientation film material stored in a tank is discharged via nozzles, such that the substrate P is coated with the orientation film material. Solid polyimide dissolved in a solvent of, for example, γ-butyl lactone, butyl-cellosolve, or N-methyl pyrrolidoneis, is used as the orientation film material. Then, the substrate P is left to stand for one minute, for example, while being maintained in a horizontal orientation in the discharge apparatus 114. In this manner, the deposited orientation film material is leveled out. The substrate is then moved from the discharge apparatus 114 to the belt conveyor BC and conveyed to the reduced pressure drying apparatus 2 by the belt conveyor BC.

Next, a treatment is performed to dry the orientation film material applied to the substrate P (step S12). Specifically, the substrate P conveyed to the reduced pressure drying apparatus 2 by the belt conveyor BC is mounted on the mounting base 12 and is brought inside the reduced pressure drying apparatus 2.

Figure 5:
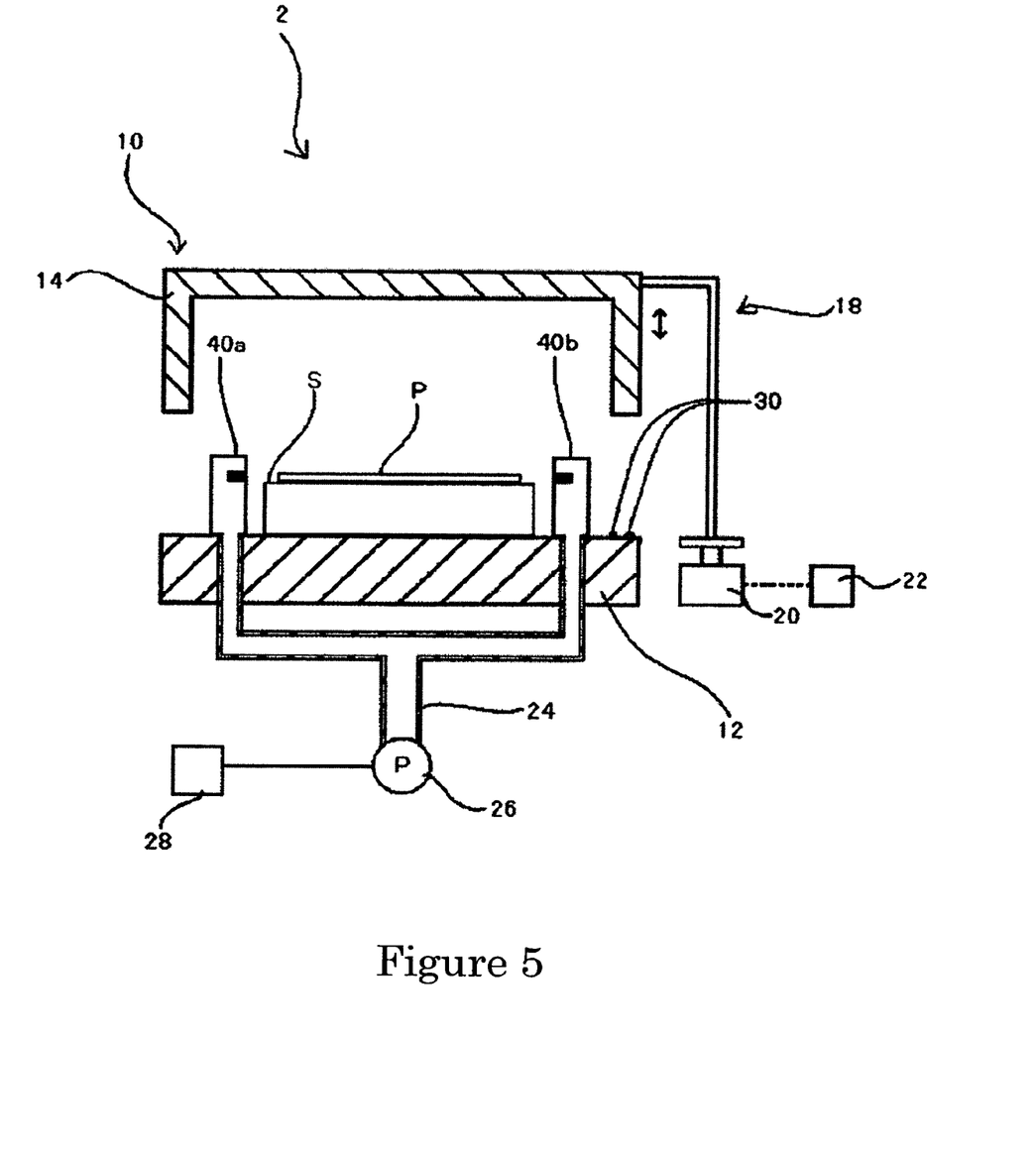
FIG. 5 is a diagram describing the reduced pressure drying operation of the reduced pressure drying apparatus according to the embodiment of the present invention.

The drying treatment by the reduced pressure drying apparatus 2 will now be described. First, the substrate P is conveyed from the discharge apparatus 114 by the belt conveyor BC and is mounted onto the mounting base 12. At this time, the lid 14 is raised by the hoist mechanism 18 as shown in FIG. 5. The lid 14 is lowered when the substrate P is moved to and fixedly held to the stage S. As the lid 14 is lowered, the lower end section of the lid 14 is brought into close contact with the mounting base 12, such that an airtight treatment chamber 10 is formed by the lid 14 and the mounting base 12 with the O ring 30.

Next, the suction pump 26 is operated and the atmosphere in the treatment chamber begins to be suctioned out via the exhaust tube 24 at a predetermined amount of pressure. An air current is accordingly formed in the treatment chamber 10. This air current is formed in the direction toward the exhaust ports 40a, 40b, 40c, and 40d, and the atmosphere in the treatment chamber 10 is suctioned out via the openings 42a formed in the exhaust ports 40a-40d and the exhaust tube 24. At this time, the atmosphere in the treatment chamber 10 is discharged at the same discharge rate in each of the exhaust ports 40a-40d.

Then, after drying is performed for a predetermined period of time, the suction pump 26 is stopped and the pressure reduction within the treatment chamber 10 is halted. The lid 14 is then raised by the hoist mechanism 18 (see FIG. 5), and the treatment chamber 10 is opened. The substrate P held on the stage S is then transferred to the belt conveyor BC in the same manner in which the substrate P was brought in. The substrate P transferred to the belt conveyor BC is transported from the reduced pressure drying apparatus 2 to the baking apparatus 116.

Next, the dried orientation film material is baked (step S13). Specifically, the substrate P that is conveyed to the baking apparatus 116 by the belt conveyor BC is baked at 180-250° C., for example. The baked substrate P on which the orientation film is formed is then moved back to the belt conveyor BC and is further conveyed to the rubbing apparatus 118 by the belt conveyor BC.

Next, the orientation film formed on the substrate P is rubbed (step S14). Specifically, the substrate P conveyed to the rubbing apparatus 118 by the belt conveyor BC is subjected to a rubbing treatment, in which the orientation film formed on the substrate P is buffed with a cloth, for example. After the orientation film has been rubbed, the substrate P is moved back to the belt conveyor BC and conveyed via the belt conveyor BC to a substrate storing cassette or the like (not shown), where the substrate is to be stored.

Once the substrate P is stored in the substrate storing cassette, the substrate P is brought to an assembly apparatus (not shown), where the substrate P is attached to another substrate. Such another substrate may have a color filter, a black matrix, an overcoating film, a common electrode, and an orientation film. Liquid crystal is poured between the attached substrates, whereby a liquid crystal display device is manufactured.

In the reduced pressure drying apparatus according to the embodiment of the present invention, exhaust ports are formed at positions facing all side faces of the stage S on which the substrate P is mounted. Openings are formed in the exhaust ports in the vicinity of the surface position SP of the substrate P. The openings are formed particularly at positions that are substantially at the same height as the surface position SP of the substrate P or at positions lower than the surface position SP of the substrate P. Therefore, as a result of air being discharged at a uniform discharge rate from all side faces of the substrate P, the drying rate of the substrate surface can be kept constant, unlike the case where the air is discharged through exhaust ports that are provided at, for example, the center of the bottom surface of the chamber. Therefore, occurrence of localized formation of air bubbles and localized swelling of the solution can be reduced, and it is possible to make the thickness of the resulting film more uniform.

Also, in the reduced pressure drying apparatus according to the embodiment of the present invention, the openings formed in the exhaust ports have slit shapes that extend horizontally along the edges of the substrate P. Consequently, the atmosphere over the surface of the substrate P mounted on the stage S can be suctioned out along the edges of the substrate P. Therefore, the drying rate on the surface of the substrate P can be kept uniform. It is thus possible to form a film with a more uniform thickness with higher precision.

In the reduced pressure drying apparatus according to the embodiment described above, manufacturing of a liquid crystal display device is described as an example. However, the present invention may also be used in manufacturing of other devices. For example, the present invention may be used in the manufacturing process of a color filter, an overcoating film, an organic EL, a semiconductor element, or the like.

Also, in the reduced pressure drying apparatus according to the embodiment described above, the exhaust ports are provided at positions facing the side faces of a square-shaped stage. However, the reduced pressure drying apparatus of the present invention is not limited to such configuration. For example, exhaust ports may be provided at positions facing the four corners of the square-shaped stage.

Figure 6:
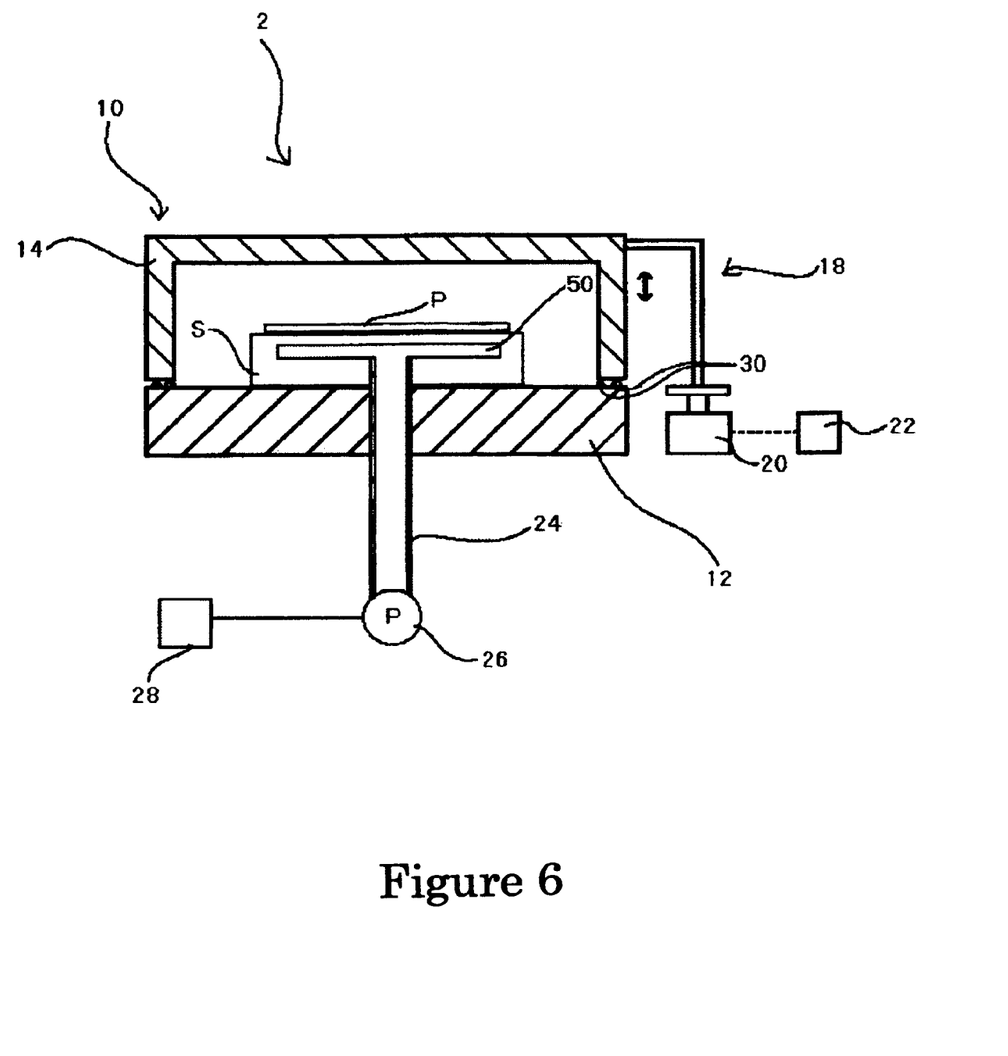
FIG. 6 is a schematic view of the reduced pressure drying apparatus according to an alternative embodiment of the present invention.

Also, as shown in FIG. 6, slit-shaped openings 50 may be formed on the four side faces of the stage S. Specifically, since openings only need to be formed in the vicinity of the surface position SP of the substrate at positions lower than the surface position SP of the substrate, the slit-shaped openings 50 can be formed in the stage S, thereby integrating the stage S and the exhaust ports as shown in FIG. 6.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A reduced pressure drying apparatus, comprising:
   a chamber configured to be closed in an airtight manner during a reduced pressure drying operation;
   a stage on which a substrate is adapted to be mounted, the stage being configured to be disposed within the chamber during the reduced pressure drying operation, the stage having four side surfaces; and
   an exhaust unit having an exhaust tube that opens at exhaust openings within the chamber, the exhaust unit being configured to discharge atmosphere from the chamber via the exhaust openings during the reduced pressure drying operation to reduce the pressure within the chamber,
   the exhaust openings being a slit-shaped opening formed on each of the side faces of the stage with the side faces being perpendicularly oriented with respect to a substrate mounting surface of the stage on which the substrate is adapted to be mounted.

2. A reduced pressure drying apparatus comprising:
   a chamber configured to be closed in an airtight manner during a reduced pressure drying operation;
   a stage on which a substrate is adapted to be mounted, the stage being configured to be disposed within the chamber during the reduced pressure drying operation;
   exhaust ports that are disposed within the chamber in a space formed between a side wall of the chamber and a side face of the stage at positions spaced apart from the side wall of the chamber and the side face of the stage; and
   an exhaust unit having an exhaust tube that opens at exhaust openings, the exhaust openings being formed at the exhaust ports such that each of the exhaust ports has one of the exhaust openings, the exhaust unit being configured to discharge atmosphere from the chamber via the exhaust openings during the reduced pressure drying operation to reduce the pressure within the chamber when the substrate is placed on the stage,
   the exhaust ports being disposed around the stage such that the exhaust openings face side faces of the stage.

3. The reduced pressure drying apparatus according to claim 2, further comprising
   the exhaust openings are formed at the exhaust ports such that each of the exhaust ports has one of the exhaust openings.

4. The reduced pressure drying apparatus according to claim 1, wherein
   the slit-shaped openings extend substantially horizontally.

5. The reduced pressure drying apparatus according to claim 2, wherein
   the exhaust openings are formed at a position that is lower than the surface position of the substrate.

6. The reduced pressure drying apparatus according to claim 2, wherein
   the exhaust openings are formed at a position that is lower than the surface position of the substrate by 1-5 mm.

7. The reduced pressure drying apparatus according to claim 2, wherein
   at least one of the exhaust openings has a slit shape that extends substantially horizontally.

* * * * *